(12) United States Patent
Bukaric (10) Patent No.: US 9,393,913 B2
(45) Date of Patent: Jul. 19, 2016

(54) LOAD CARRIER FOR A VEHICLE

(71) Applicant: Thule Sweden AB, Hillerstorp (SE)

(72) Inventor: Jasmin Bukaric, Värnamo (SE)

(73) Assignee: Thule Sweden AB, Hillerstorp (SE)

( * ) Notice: Subject to any disclaimer, the term of this patent is extended or adjusted under 35 U.S.C. 154(b) by 101 days.

(21) Appl. No.: 14/424,000

(22) PCT Filed: Aug. 28, 2013

(86) PCT No.: PCT/EP2013/067836
§ 371 (c)(1),
(2) Date: Feb. 25, 2015

(87) PCT Pub. No.: WO2014/033180
PCT Pub. Date: Mar. 6, 2014

(65) Prior Publication Data
US 2015/0283952 A1 Oct. 8, 2015

(30) Foreign Application Priority Data

Aug. 28, 2012 (EP) .................... 12182012

(51) Int. Cl.
*B60R 9/00* (2006.01)
*B60R 9/10* (2006.01)
*B60R 9/06* (2006.01)

(52) U.S. Cl.
CPC .... *B60R 9/10* (2013.01); *B60R 9/06* (2013.01)

(58) Field of Classification Search
CPC ................ B60R 9/10; B60R 9/00; B60R 9/06
See application file for complete search history.

(56) References Cited

U.S. PATENT DOCUMENTS

| 5,244,133 A * | 9/1993 | Abbott ...................... B60R 9/10 224/521 |
| 5,685,686 A * | 11/1997 | Burns ...................... B60R 9/06 224/282 |
| 5,775,560 A * | 7/1998 | Zahn ........................ B60R 9/06 224/485 |
| 6,443,345 B1 * | 9/2002 | Bloemer ................... B60R 9/06 224/502 |
| 6,616,023 B1 | 9/2003 | Dahl et al. |
| 2003/0057245 A1 * | 3/2003 | Dean ........................ B60R 9/06 224/519 |
| 2008/0093404 A1 | 4/2008 | Clausen et al. |
| 2008/0099522 A1 * | 5/2008 | Clausen ................... B60R 9/10 224/519 |

(Continued)

FOREIGN PATENT DOCUMENTS

| AU | 74846 74 | 5/1976 |
| CA | 2 244 445 | 1/2000 |

(Continued)

OTHER PUBLICATIONS

Extended European Search Report, European Patent Office, Berlin, Germany, mailing date of Jan. 11, 2013, 8 pages.

(Continued)

*Primary Examiner* — Brian D Nash
(74) *Attorney, Agent, or Firm* — Sterne, Kessler, Goldstein & Fox P.L.L.C.

(57) ABSTRACT

A load carrier for a vehicle, such as a bike carrier, including two load receiving sections each including at least one arm, e.g. a pivot arm. A center piece is positioned between the two load receiving sections. The center piece includes a first and a second connection portion and a bridging portion between the first and the second connection portion. The bridging portion and/or the load receiving sections includes a framework structure for improving the torsional rigidity while maintaining a low weight structure.

12 Claims, 5 Drawing Sheets

(56) References Cited

U.S. PATENT DOCUMENTS

2009/0120984 A1* 5/2009 Sautter .................. B60R 9/10
224/497
2011/0057008 A1 3/2011 Clausen et al.

FOREIGN PATENT DOCUMENTS

| DE | 10 2009 016534 | 10/2010 |
| EP | 2 014 510 | 1/2009 |
| WO | WO 2012/003428 | 1/2012 |

OTHER PUBLICATIONS

International Search Report and Written Opinion of the International Searching Authority for International No. PCT/EP2013/067836, European Patent Office, Berlin, Germany, mailing date of Nov. 25, 2013, 10 pages.

* cited by examiner

LOAD CARRIER FOR A VEHICLE

TECHNICAL FIELD

A load carrier, such as a bike carrier, for a vehicle and adapted to be mounted on a towing bar of the vehicle. The load carrier comprises load receiving section connected together via a center piece.

BACKGROUND

Load carriers, e.g. sports equipment carriers, e.g. bicycle carriers, also referred to as bike carriers, can usually be mounted to a towing bar arranged at the rear of a vehicle. Load carriers serve their purpose when in use, but can be cumbersome when stored, e.g. in a garage for example, or when removed from the vehicle for storage.

The European Patent No. EP 1,539,537 B1, Thule Sweden AB, disclose a load carrier for carrying a bicycle. The load carrier is foldable, with two pivotable load receiving portions pivotally connected to a center piece. A license plate holder is positioned on the center piece. The foldable, or pivotable, load carrier can be made less bulky, permitting it to be tucked away and stored in an easy manner.

The concept of folding load carriers has emerged from the need to have flexible and user friendly load carriers however, the need for rigid and sturdy load carriers remains and especially from a safety point of view. The European patent application No. EP 2,014,510 A2, disclose a load carrier having a tubular frame to which foldable arms are connected. The tubular frame has a square like form, which does not provide a high level of torsional rigidity.

SUMMARY

It is an object of the present invention to provide for a rigid load carrier, having an improved, or relatively high, torsional rigidity yet having a relatively low weight construction, or to provide for a useful alternative. The objects are at least partly met by a load carrier for a vehicle, such as a bike carrier, adapted to be mounted to a vehicle for transporting a load. The load carrier comprises a first and a second load receiving section adapted to at least partly carry the load. The first and the second load receiving section are connected to a center piece at a first and a second connection portion.

The center piece comprises a bridging portion between the first and the second connection portions. The bridging portion and/or at least one of the load receiving sections comprises a framework structure. The center piece is thus constructed in a sturdy and rigid manner, which enables the center piece to be manufactured in a light weight material such as aluminium, or in a polymeric material such as carbon fibre reinforced polymeric material.

The bridging portion is at least partly formed by a load facing wall and a lower wall, the load facing wall and the lower wall defines a void there between. The bridging portion further comprises at least one supportive wall extending between the load facing wall and the lower wall. The at least one supportive wall partitions the void to at least a first and a second sub-void.

According to an aspect at least one of the first or the second sub-void comprises at least one supportive wall, partitioning at least one of the first or the second sub-voids to at least a third and a forth sub-void of the center piece. With additional supportive walls, the rigidity and especially the torsional rigidity can be increased.

According to an aspect, at least one of the first and the second load receiving sections comprises a load facing wall and a lower wall defining a void there between. The at least one of the first and the second load receiving sections comprises at least one supportive wall extending between the load facing wall and the lower wall partitioning the void to at least a first and a second sub-void.

Optionally, at least one of the first or the second sub-void of the load receiving section comprises at least one supportive wall, partitioning the at least one of the first or the second sub-void of the load receiving section to at least a third and a forth sub-void of the load receiving section. By selecting the appropriate number of supportive walls, the rigidity and especially the torsional rigidity can be adapted to the specific load, which is intended to be carried by the load carrier.

According to an aspect, the center piece comprises a bridging portion between the first and the second load receiving sections. The bridging portion comprises a first and a second connection portion, for connection to the first and the second load receiving section. Optionally, the bridging portion and the first and the second connection portions of the bridging portion are formed in one unitary piece of material.

According to an aspect the first and the second load receiving sections comprises at least a first pivot arm pivotally connected to the center piece, optionally a second pivot arm pivotally connected to the center piece. The center piece can be provided with two or more pivot arms, advantageously 4 or more pivot arms. It is suitable to have two pivot arms for each bike intended to be transported on the bike carrier, or load carrier. The pivot arms are positioned on opposing sides of the center piece, i.e. the center piece is substantially positioned between the pivot arms in a bridging manner, when the pivot arms are in a carrier position, or operative position. The bridging portion bridges directly between at least two pivot arms.

According to an aspect, the first and/or the second pivot arm comprises a pivot connection portion for connection to the center piece, wherein the first and/or the second pivot arm and the connection portion are formed in one unitary piece of material. Each pivot arm has a distal end and a proximal end, the proximal end is connected to the center piece. The connection portion is thus in the proximal end of the pivot arm. Optionally, the proximal end of the pivot arm(s) is forming the connection portion.

According to an aspect, at least one the pivot arms are formed by extrusion, advantageously two pivot arms are formed by extrusion, or at least two pivot arms are formed by extrusion. In an embodiment, all of the pivot arms of the load receiving sections are formed by extrusion.

According to an aspect the first and second pivot arms has a width, and wherein the void, and the sub-voids of the pivot arms has an extension, or length substantially corresponding to the width of the pivot arms.

According to an aspect, the center piece and the first and the second load receiving section comprise a framework for increasing the structural integrity of the bike carrier. The pivot arms of the load receiving sections comprise a framework for increasing the structural integrity of the bike carrier. The framework is formed by one or more supportive walls extending between a load facing wall and a second wall, referred to as the lower wall.

According to a second aspect of the invention, it is an object to provide a load carrier for a vehicle, such as a bike carrier, adapted to be mounted to a vehicle for transporting a load. The load carrier comprises a first and a second pivot arm pivotable between an operative position, or a carrier position, and an idle position, or a storage position, and adapted to at least partly carry the load when being positioned in the operative position. The first and second pivot arms are pivotably connected to a center piece at a first and a second pivot connection portion.

The center piece comprises a bridging portion between the first and the second pivot connection portions. The bridging portion and first and the second pivot connection portions are formed in one unitary piece of material.

According to an aspect, the first and the second connection portion comprise at least first and a second cut out, or slot, adapted to receive a part of the first and the second arm. The first and the second pivot arm is adapted to pivot in the first and the second cut out, or slot. The first and the second connection portion can comprises two cut outs, or slots, each to receive a pivot arm, preferably the first and the second connection portion comprises one cut out, or slot, for each pivot arm.

According to an aspect, the first and the second cut out, or slot, provides each of the first and the second pivot arm with at least one stop surface, the at least one stop surface providing the first and the second pivot arm with a pivot stop. The pivot arms can be made to rest on the at least one stop surface of the cut out, or slot, for example, to support the pivot arm and thus also at least partly support the weight of the load imparted to the pivot arms.

According to an aspect, the first and second pivot arms are pivotably connected to the center piece at a first and a second pivot connection portion and pivotable about a first and a second pivot axis, the first and the second pivot axis are formed by separate pivot axles, or by an axle formed by the center piece. The center piece can be provided with two or more pivot arms, advantageously 4 or more pivot arms. It is suitable to have two pivot arms for each bike intended to be transported with the bike carrier, or load carrier. The pivot arms are positioned on opposing sides of the center piece, i.e. the center piece is substantially positioned between the pivot arms in a bridging manner, when the pivot arms are in a carrier position, or operative position. The bridging portion bridges between at least two pivot arms directly.

The center piece, and/or the pivot arms can be formed by extrusion.

The center piece can be arranged directly to the vehicle, or optionally on a sub frame, the sub frame comprising a vehicle coupling arrangement for connecting the load carrier to the vehicle.

According to an aspect, a load carrier for a vehicle, such as a bike carrier comprising two load receiving sections, preferably pivotally connected to a center piece. Each load receiving section comprises at least one arm, e.g. a pivot arm. The center piece is positioned between the two load receiving sections. The center piece comprises a first and a second connection portion and a bridging portion between the first and the second connection portion. The bridging portion and/or the load receiving sections, preferably the pivot arms of the load receiving sections, comprises a framework structure for improving the torsional rigidity while maintaining a low weight structure.

BRIEF DESCRIPTION OF THE DRAWINGS

Non-limiting embodiments will be described in greater detail with reference to the accompanying Figures.

DETAILED DESCRIPTION

Figure 1:
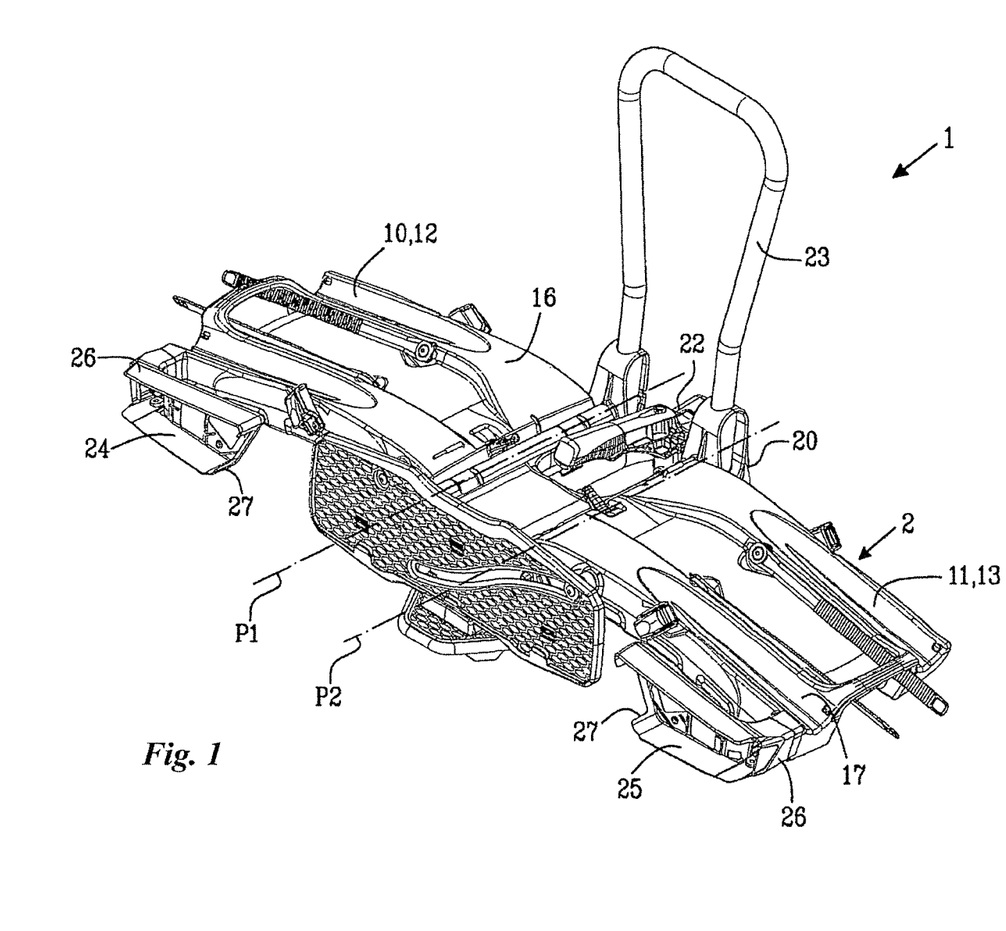
FIG. 1 shows a load carrier in the form of a bike carrier positioned in an operative position, or carrier position, ready to receive a load.

FIG. 1 shows a load carrier 1 for a vehicle (not shown) adapted to be attached to a towing bar of the vehicle. The load carrier 1 is in the shown embodiments a bike carrier 2, in this case adapted to carry two bikes. Instead of carrying bikes, the load carrier 1 could carry luggage, sports equipment such as surfboards, skies, or any other item usable to man.

The load carrier 1 can be positioned in a carrier position, also referred to as an operative position, as shown in FIG. 1 in which the load carrier 1 can receive and carry an item for transportation, and a storage position, also referred to as an idle position, in which the load carrier 1 can be put away for storage. At least one part of the load carrier 1 is foldable; it can be pivoted, between the carrier position and the storage position. In the storage position, the load carrier could possibly be transported on the towing hook of the vehicle but it cannot be used for transporting items, at least not as intended and not to the same extent as when being in the carrier position.

In the following, the bike carrier 2 will be described in greater detail with reference to the accompanying Figures. FIG. 1 is a view in perspective of the bike carrier 2. The bike carrier 2 comprises a first and a second load receiving section 10, 11, each comprising a load receiving surface 12, 13. The first and the second load receiving sections 10, 11 are pivotally mounted to a center piece 40 which in turn is mounted to a frame member 20. The frame member 20 comprises a towing bar coupling 22 adapted to be mounted to the towing bar of the vehicle. The first and the second load receiving sections 10, 11 are adapted to pivot about a first and a second pivot axis P1, P2 respectively; indicated with dashed lines in FIG. 1 and FIG. 2. The towing bar coupling 22 is of a standard type comprising a socket adapted to receive and connect to a ball of the towing bar of the vehicle, to form a ball and socket joint.

In FIG. 1, the first and the second load receiving sections 10, 11 are arranged substantially aligned in a side-by side manner on either side the center piece 40. The frame member 20 further comprises a U-formed bar 23 to which one or more bikes can be coupled, optionally via securing members such as lines, attachment arms or the like, for providing support and stability during transportation. A bike can thus be positioned on the bike carrier 2 with one wheel on each load receiving section 10, 11 and then additionally be supported by being connected to the U formed bar 23. The wheels of the bike may further be attached to the load receiving sections 10, 11, e.g. using straps.

A first and a second rear light socket 24, 25 is arranged on the first and the second load receiving section respectively of the bike carrier 2, and are powered by the electrical system of the vehicle via e.g. a cord. The first and the second rear light sockets 24, 25 each comprises a proximal end 26 and a distal end 27, and is attached to the respective load receiving sections 10, 11 at the proximal end 26. The first and the second rear light sockets 24, 25 extend substantially parallel with the extension of the first and the second load receiving sections 10, 11. The first and the second rear light sockets 24, 25 are further separated a distance from the first and the second load receiving sections 10, 11 of about 1-10 cm, advantageously 2-7 cm, or an appropriate distance adapted for a license plate holder and an attached license plate (not shown) to fit there between, when being positioned in the storage position. The first and the second load receiving sections 10, 11 each comprises a first and a second housing 16, 17, providing the first and the second load receiving sections 10, 11 with protection from the ambient environment, such as dirt, rain, grabble etc. A housing can also be useful for providing rigidity to internal pivot arms, which will be described in greater detail below. The first and the second housing 16, 17 also provide an aesthetic pleasing look to the bike carrier 2. The first and the second housing 16, 17 can be formed by a plastic material such as polypropylene, polyethylene, acrylonitrile butadiene styrene (ABS), polyurethane, or the like, or mixtures thereof. Aluminum is also a suitable material.

Figure 2:
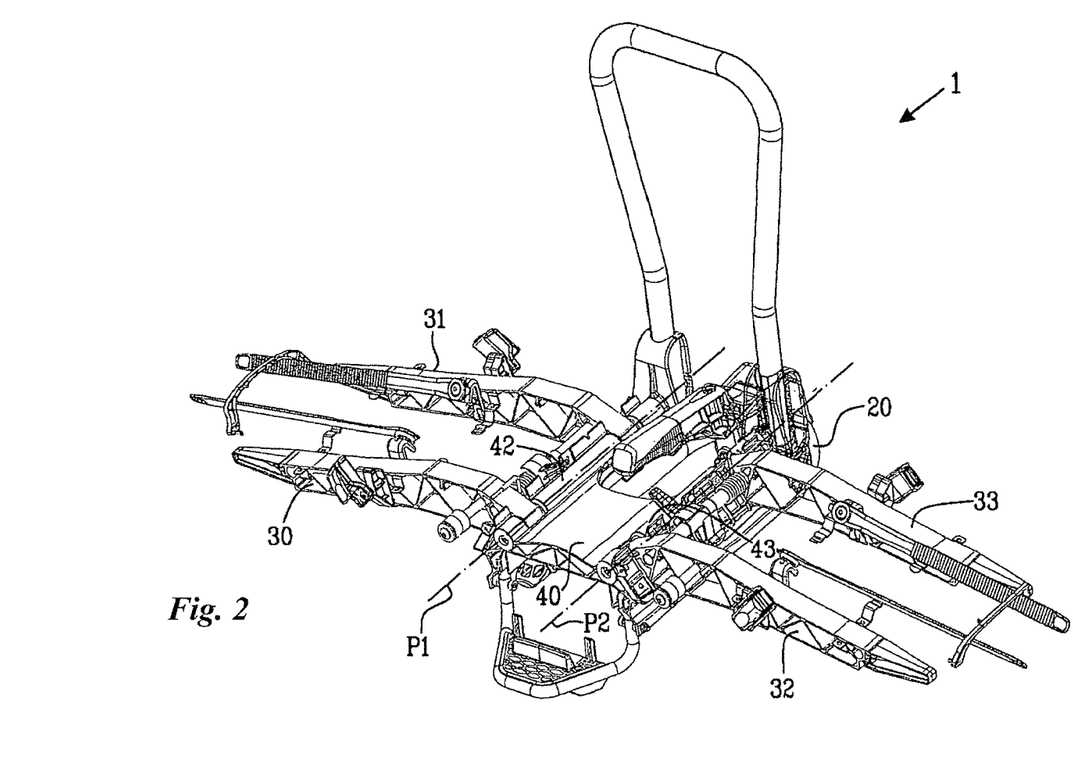
FIG. 2 shows the bike carrier of FIG. 1 without a housing and with the pivot arms exposed.

FIG. 2 shows the bike carrier 2 of FIG. 1 but without the first and the second housing 16, 17. As is noticed, each load receiving section 10, 11 comprises a first and a second pivot arm 30, 31, 32, 33. The first and the second pivot arms 30, 31, 32, 33 of the first and the second load receiving sections 10, 11 are pivotally connected the a center piece 40. The center piece 40 is configured to be mounted to the frame member 20 and functions as a console to the first and the second pivot arms 30, 31, 32, 33 of the first and the second load receiving sections 10, 11. It further bridges the first and the second load receiving sections 10, 11 together in a rigid manner. As is noticed, it bridges directly between two opposing pivot arms 30, 32, i.e. between one pivot arm of the first and the second load receiving sections 10, 11. It should be noted that in other embodiments, the center piece 40 can be mounted directly to the towing bar of the vehicle instead of an intermediate frame member, such as the frame member 20.

The center piece 40 can be provided with two or more pivot arms, advantageously 4 pivot arms as in the shown embodiment. It is suitable to have two opposing pivot arms for each bike intended to be transported with the bike carrier 2. The pivot arms 30, 31, 32, 33 are positioned on opposing sides of the center piece 40, so that the center piece 40 is substantially positioned between the pivot arms and bridges the distance at least between two of the four pivot arms 30, 32, when the pivot arms are in a carrier position, or operative position. The first and the second pivot arms 30, 31 of the first load receiving section 10 are connected to the center piece 40 at a first connection portion 42, while the first and the second pivot arms 32, 33 of the second load receiving section 11 are connected at a second connection portion 43.

Figure 3:
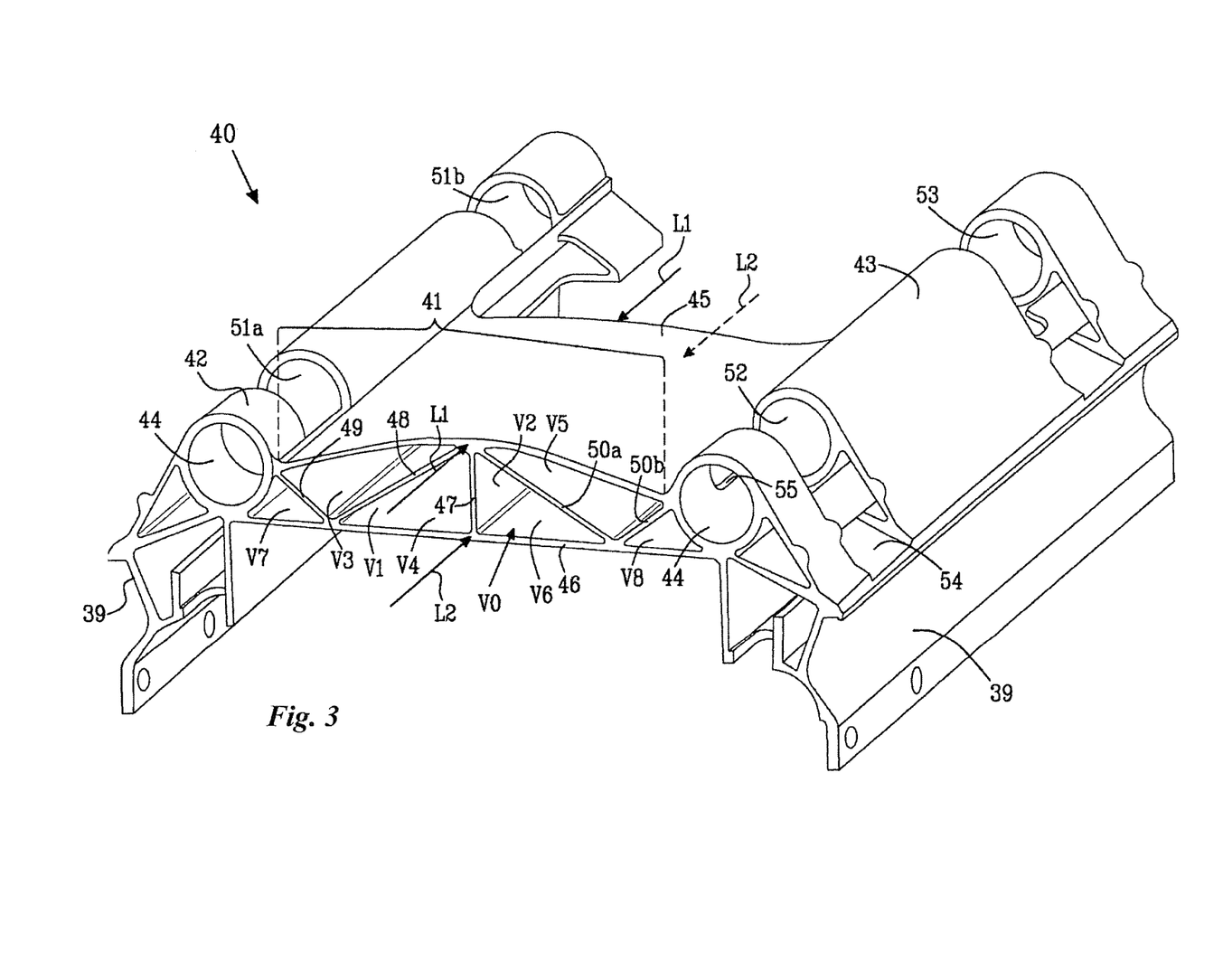
FIG. 3 shows the center piece, or console, to which the pivot arms are connected.

FIG. 3 shows the center piece 40 in greater detail. The center piece 40 comprises a bridging portion 41, bridging between the first and the second load receiving sections 10, 11 and the pivot arms 30, 31, 32, 33 (shown in FIG. 1). The first and the second connection portions 42, 43 of the center piece 40, and the bridging portion 41 are formed in one unitary piece of material, in this case, formed by extruded aluminum. Further associated with each of the first and the second connection portions 42, 43 is a frame member connection portion 39 for connection with the frame member 20. The first and the second frame member connection portions 39, the first and the second connection portions 42, 43 of the center piece 40, and the bridging portion 41 are formed in one unitary piece of material.

The framework of the center piece 40 is also clearly shown in FIG. 3. To support the first and the second connection portions 42, 43 of the center piece 40, the bridging portion 41 has a framework structure. The bridging portion 41 comprises a load facing wall 45 intended to face the load when the bike carrier 2 is mounted to the vehicle and operative, and a lower wall 46, intended to face towards the ground when the bike carrier 2 is mounted to the vehicle and in the carrier position, or operative position. The load facing wall and the lower wall 45, 46 defines a cardinal void V0, in the shown embodiment, together with parts of the first and the second connection portions 42, 43. The cardinal void V0 is partitioned in a number of sub-voids V1-Vn, dependent on the desired structural properties, such as stiffness or strength for example. Each sub-void can further be partitioned in additional sub-voids by additional supportive walls. The supportive wall provides the bridging portion 41 of the center piece 40 with structural integrity, enabling the center piece 40 to carry a relatively high amount of load via the first and the second load receiving sections 10, 11. It provides a light weight structure which is strong and has a high torsional rigidity.

In the shown embodiment of FIG. 3; a first supportive wall 47 partitions the cardinal void V0 into a first and a second sub-void V1, V2. The first sub-void V1 is further partitioned by a second supportive wall 48 in a third and a forth sub-void V3, V4, in a similar manner, the second sub-void V2 is partitioned in a fifth and sixth sub-void V5, V6. The cardinal void V0 is thus portioned in a selected number of sub-voids V1-V8 by a number of supportive walls 47, 48, 49, 50a, 50b. The sub-voids have in the shown embodiment a form substantially corresponding to a triangle in cross section. The voids V0-V8 further has an extension defined by the length of the supportive walls, the load facing wall 45, and the lower wall 46. At least one supportive wall has a length L1, and the load facing wall has a length L2, the length L1 of the at least one supportive wall is substantially equal to the length L2 of the load facing wall.

It has been found that it is advantageous to form the center piece and/or at least one of the pivot arms by extruded aluminum. During the extrusion process, the framework structure of the center piece and the pivot arms can easily be formed. With reference to FIG. 3, the first and the second connection portion 42, 43 and the bridging portion 41 of the center piece 40 is formed in one unitary piece of material. The first and the second connection portions 42, 43 comprises a circular cross section forming a tube 44, enveloping an axle (A1, A2 in FIG. 4) to connect the pivot arms 30, 31, 32, 33 (not shown in FIG. 3). Cut outs, or slots, 51a, 51b, 52, 53 are milled from the center piece 40 so that the axle can be exposed for connection with the pivot arms 30, 31, 32, 33. The cut outs 51a, 51b, 52, 53, each comprise a first and a second stop surface 54, 55 which defines an available pivot angle α. The available pivot angle α is in the order of 90 degrees, optionally between 70-120 degrees, and defines the amount of degrees which the pivot arms 30, 31, 32, 33 are permitted to pivot between the carrier position and the storage position. The pivot arms 30, 31, 32, 33 comprises corresponding stop surfaces interacting with the first and the second stop surfaces 54, 55 of the cut outs 51a, 51b, 52, 53 of the center piece 40.

Figure 4:
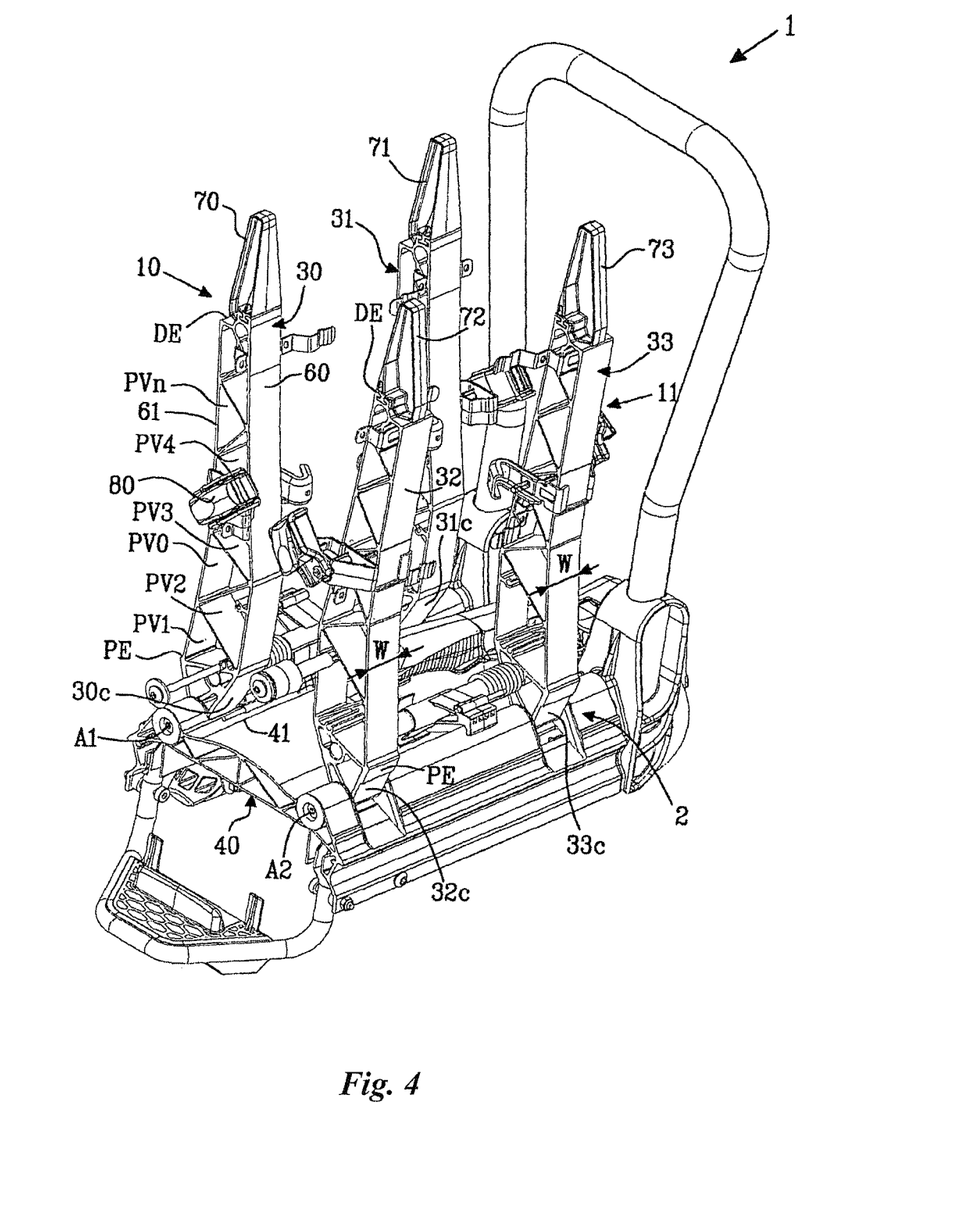
FIG. 4 shows the bike carrier of FIG. 2 with the pivot arms in an storage position, or idle position.

FIG. 4 shows the embodiment of FIGS. 1-3 but with the first and the second pivot arms 30, 31 of the first load receiving section 10 and the first and the second pivot arms 32, 33 of the first load receiving section 11 in a raised position. The bike carrier 2 is in this position in a storage position, or idle position. The bike carrier 2 can still be mounted to a vehicle in this position, or easily be tucked away for storage e.g. in a garage or similar. As is noticed in FIG. 4 (also visible in FIG. 2), each of the pivot arms 30, 31, 32, 33 comprises a framework structure for supporting the structural integrity of the pivot arms 30, 31, 32, 33.

Each pivot arm 30, 31, 32, 33 comprises a proximal end PE and a distal end DE, and a width W. The proximal ends PE of the first and the second pivot arms 30, 31, 32, 33 of the first and the second load receiving sections 10, 11 each comprises a connection portion 30c, 31c, 32c, 33c which are formed in one unitary piece of material with the first and the first and the second pivot arms 30, 31, 32, 33. Each of the connection portions 30c, 31c, 32c, 33c of the first and the second pivot arms 30, 31, 32, 33 of the first and the second load receiving sections 10, 11 can be connected directly to the center piece 40 and the corresponding connection portions 42, 43 of the center piece 40, or optionally as in the embodiment shown via an a first and a second axle A1, A2.

In a similar manner as with the center piece 40, as described above, each pivot arms 30, 31, 32, 33 comprises a load facing wall 60, and a lower wall 61. The bike carrier 2 comprises four pivot arms 30, 31, 32, 33 but only one will be described in detail herein. It should be noted however that the pivot arms 30, 31, 32, 33 of the bike carrier 2 can be, identical, or substantially identical, pivot arms, or they can be individually formed and configured.

It has been found advantageous to form the pivot arms from extruded aluminum, and that at least two of the pivot arms 30, 31, 32, 33 are identical, or their mirror image, in their extruded form. The load facing wall 60 is intended to face the load when the bike carrier 2 is mounted to the vehicle and in the carrier position or operative position, and the lower wall 61, is intended to face towards the ground when the bike carrier 2 is mounted to the vehicle and in the carrier position or operative position. The load facing wall and the lower wall 60, 61 defines a pivot arm cardinal void PV0. The pivot arm cardinal void PV0 is partitioned by supportive walls, just like the center piece 40, in a number of sub-voids PV1-PVn, dependent on the desired structural properties, such as stiffness or strength for example. Each sub-void can further be partitioned in additional sub-voids by additional supportive walls. The supportive walls form a framework structure and provide the pivot arms 30, 31, 32, 33 with structural integrity, enabling the pivot arms 30, 31, 32, 33 to carry a relatively high amount of load via the first and the second load receiving sections 10, 11.

The cardinal void and the sub-voids of the center piece 40, as well as the voids of the pivot arms 30, 31, 32, 33 have an extension, or length. The extension of the voids and sub-voids of the pivot arms 30, 31, 32, 33 are advantageously equal to the width W of the pivot arms 30, 31, 32, 33.

It should be noted that the center piece 40 and the pivot arms 30, 31, 32, 33 could comprise smaller cut out portions, however, the main part of the extension of the voids or sub-voids should be equal to the width of the pivot arms and/or the bridging portion respectively.

FIG. 4 further shows pivot arm extensions 70, 71, 72, 73 which are arranged on the distal end of the pivot arms 30, 31, 32, 33. The pivot arm extensions 70, 71, 72, 73 can advantageously be manufactured from a polymer composition such as polypropylene, polyethylene, acrylonitrile butadiene styrene (ABS), polyurethane or mixtures thereof.

Each of the pivot arms 30, 31, 32, 33 of the first and the second load receiving sections 10, 11 can further be arranged with a bike attachment strap 80, for attaching the bike to the load receiving section 10, 11 and the bike carrier 2. Other accessories and items can be attached to the pivot arms 30, 31, 32, 33, such as the housing 16, 17, as seen in FIG. 1. A bike attachment strap 80 is advantageously attached to a pivot arm in the proximity of an intersection between at least two walls, such as at least between a supportive wall and the upper load facing wall, or between two supportive walls and the upper load facing wall, or between a supportive wall and the lower wall, or between two supportive walls and the lower wall.

Figure 5:
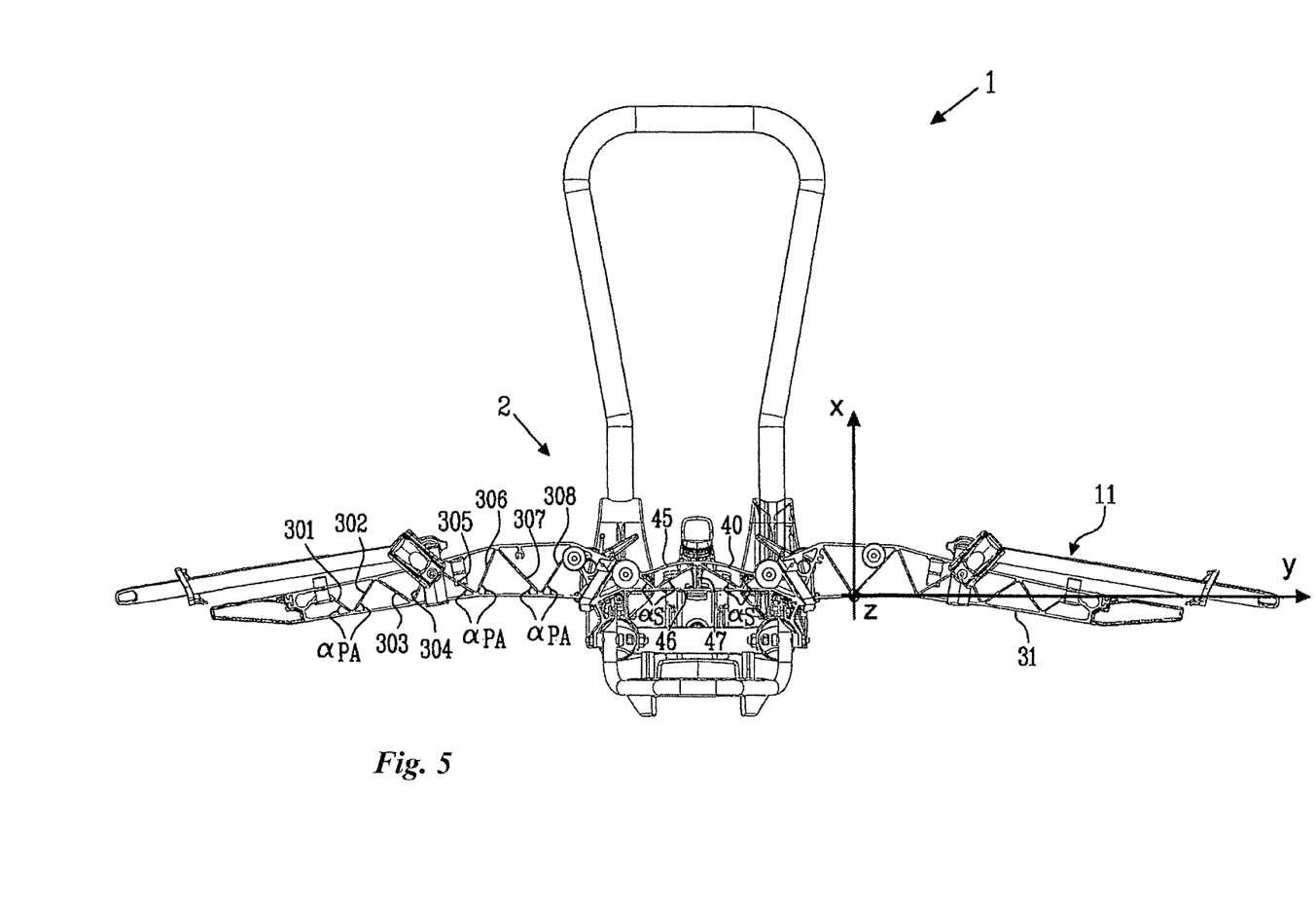
FIG. 5 shows the bike carrier of FIG. 2 with the pivot arms in a carrier position, or operative position with a view straight towards the side of the bike carrier 2.

FIG. 5 shows the embodiment of FIGS. 1-4 but with the first and the second pivot arms 30, 31 of the first load receiving section 10 and the first and the second pivot arms 32, 33 of the first load receiving section 11 in the carrier position. The bike carrier 2 is thus in the carrier position, or operative position. FIG. 5 is shown with a view straight into the framework structure of the center piece 40 and the first pivot arm 30 of the first load receiving section 10 and the first pivot arm 32 of the second load receiving section 11.

For the purpose of orientation the following axis and directions are used herein; a vertical X-axis corresponding to the height of the bike carrier 2; a horizontal Y-axis corresponding to the elongation, or length, of the bike carrier 2 and; a Z-axis corresponding to the width of the bike carrier 2. The X, Y and Z-axes are perpendicular to each other.

As can be seen in FIG. 5, the center piece 40 comprises a supportive wall 47 which extends in a substantially perpendicular direction out from the lower wall 46 of the center piece 40 to the upper load receiving wall 45, i.e. in a vertical direction. The remaining supportive walls 48, 49, 50a, 50b are angled with respect to the lower wall 46 with an angle αS of about from 30-60 degrees, advantageously about 45 degrees.

Supportive walls 301-308 of the pivot arms are angled with an angle αPA of about 30-60 degrees with respect to the lower wall 61 of the pivot arm 30, but with an angle of about from 60-120 degrees between the supportive walls respectively, advantageously of about from 80-100 degrees. According to an aspect, the framework structure of the pivot arms, and/or the center piece comprises at least a first and a second supportive wall angled with about 60-120 degrees with respect to each other. The pivot arms and/or the center piece can comprise a plurality of supportive walls forming a sawtooth pattern between the upper load facing wall and the lower wall.

The invention claimed is:

1. A load carrier for a vehicle, adapted to be mounted to a vehicle for transporting a load, said load carrier comprising:
   a first and a second load receiving section, said first and second load receiving sections comprising at least a first and a second pivot arm adapted to at least partly carry said load, said first and said second pivot arms being pivotally connected to a center piece at a first and a second connection portion and pivotable about a first and a second pivot axis, said center piece comprises a bridging portion between said first and said second connection portions,
   wherein said first and said second pivot arms comprises a framework structure formed by a load facing wall and a lower wall, said load facing wall and said lower wall defining a void there between, at least one supportive wall extending between said load facing wall and said lower wall, said at least one supportive wall partitioning said void to at least a first and a second sub-void,
   wherein said first and said second pivot arms are extruded in a first direction,
   wherein said first and said second pivot arms are positioned so that said first direction is parallel with said first and said second pivot axis.

2. The load carrier according to claim 1, wherein at least one of said first or said second sub-void comprises at least one supportive wall partitioning said at least one of said first or said second sub-void to at least a third and a forth sub-void of said center piece.

3. The load carrier according to claim 1, wherein said bridging portion and said first and said second connection portions of said bridging portion are formed in one unitary piece of material.

4. The load carrier according to claim 1, wherein said first or said second pivot arm comprises a pivot connection portion for connection to said center piece, wherein said first or said second pivot arm and said pivot connection portion are formed in one unitary piece of material.

5. The load carrier according to claim 1, wherein said first and second pivot arms has a width and wherein said void and said sub-voids of said pivot arms has an extension substantially corresponding to said width of said pivot arms.

6. The load carrier according to claim 1, wherein said at least one supportive wall of said center piece has a length, and said load facing wall has a length, wherein said length of said at least one supportive wall is substantially equal to said length of said load facing wall.

7. The load carrier according to claim 1, wherein said first and said second connection portion comprises a first and a second cut out or slot adapted to receive a part of said first and said second arm.

8. The load carrier according to claim 7, wherein said first and said second pivot arm is adapted to pivot in said first and said second cut out or slot.

9. The load carrier according to claim 7, wherein said first and said second cut out or slot provides each said first and said second pivot arm with at least one stop surface, said at least one stop surface providing said first and said second pivot arm with a pivot stop.

10. The load carrier according to claim 1, wherein said first and said second pivot axis are formed by separate pivot axles, or by an axle formed by said center piece.

11. The load carrier according to claim 1, wherein said center piece is arranged on a sub frame, said sub frame comprising a vehicle coupling arrangement for connecting said load carrier to said vehicle.

12. A load carrier for a vehicle adapted to be mounted to a vehicle for transporting a load, said load carrier comprising:
a first and a second load receiving section adapted to at least partly carry said load, wherein said first and said second load receiving sections are connected to a center piece at a first and a second connection portion, wherein said center piece comprises a bridging portion between said first and said second connection portions, wherein said bridging portion comprises a framework structure formed by a load facing wall and a lower wall, said load facing wall and said lower wall defining a void there between, at least one supportive wall extending between said load facing wall and said lower wall, said at least one supportive wall partitioning said void to at least a first and a second sub-void,
wherein said center piece is extruded in a first direction,
wherein said first and said second load receiving sections are pivotally connected about a first and a second pivot axis at said center piece and positioned so that said first and said second pivot axis are parallel with said first direction.

* * * * *